United States Patent [19]
Murray

[11] Patent Number: 6,040,781
[45] Date of Patent: Mar. 21, 2000

[54] EVENT REMINDER FOR A COMMUNICATION DEVICE

[75] Inventor: Bradley A. Murray, West Palm Beach, Fla.

[73] Assignee: Motorola, Schaumburg, Ill.

[21] Appl. No.: 09/083,930

[22] Filed: May 26, 1998

[51] Int. Cl.[7] .................................................. H04Q 7/14
[52] U.S. Cl. .............................. 340/825.22; 340/825.29; 340/825.44
[58] Field of Search ..................... 340/825.44, 825.22, 340/825.28, 825.29–994, 693.1, 693.3; 455/38.4, 572, 574; 701/204; 708/112

[56] References Cited

U.S. PATENT DOCUMENTS

| | | | |
|---|---|---|---|
| 4,860,005 | 8/1989 | DeLuca et al. | 340/825.44 |
| 5,365,227 | 11/1994 | Cannon et al. | 340/825.55 |
| 5,452,356 | 9/1995 | Albert | 340/825.44 X |
| 5,457,732 | 10/1995 | Goldberg | 379/57 |
| 5,675,507 | 10/1997 | Bobo, II | 340/875.44 X |
| 5,790,974 | 8/1998 | Tognazzini | 701/204 |

*Primary Examiner*—Edwin C. Holloway, III
*Attorney, Agent, or Firm*—Pablo Meles

[57] ABSTRACT

A communication device (18) wirelessly coupled to a widely distributed information source (24) and capable of retrieving flight information therefrom includes a transceiver (54), a decoder and an encoder (58) coupled to the transceiver for respectively decoding messages received and encoding message transmitted by the communication device, a memory (66) coupled to the decoder for storing at least scheduled flight information and updated status information of the scheduled flight information, and a processor (58). The processor is programmed to remind a user of the communication device at a predetermined time before a scheduled flight to update the status of the scheduled flight information.

20 Claims, 5 Drawing Sheets

10

EVENT REMINDER FOR A COMMUNICATION DEVICE

FIELD OF THE INVENTION

The present invention is directed to a communication device, such as a selective call transceiver, and more particularly to a communication device and method capable of retrieving updated information about an event from a widely distributed information source.

BACKGROUND OF THE INVENTION

The Federal Aviation Administration (FAA) requires that all portable electronic devices that could cause interference with the navigation or communication system of the aircraft be shut off on commercial airlines. Determination of which products should be shut off and enforcement of such policy is largely left up to the individual commercial airline operators. Although some electronic devices such as laptop computers, cellular phones and two-way pagers have not been proven to cause harmful interference with sensitive avionic equipment, commercial airlines request that such consumer products be powered down at least a period of time before and after take-offs and landings. Most passengers are willing to comply, but a good number of passengers inadvertently leave their portable electronic equipment on. Many passengers don't even realize that the portable electronic devices they're carrying are the type of devices the commercial airlines would like to have shut off. Thus, what is needed is a electronic device that includes a communication device that would remind a user to change the mode of operation of their electronic device before a particular event occurs such as boarding onto or deplaning from a airplane.

DETAILED DESCRIPTION

Figure 1:
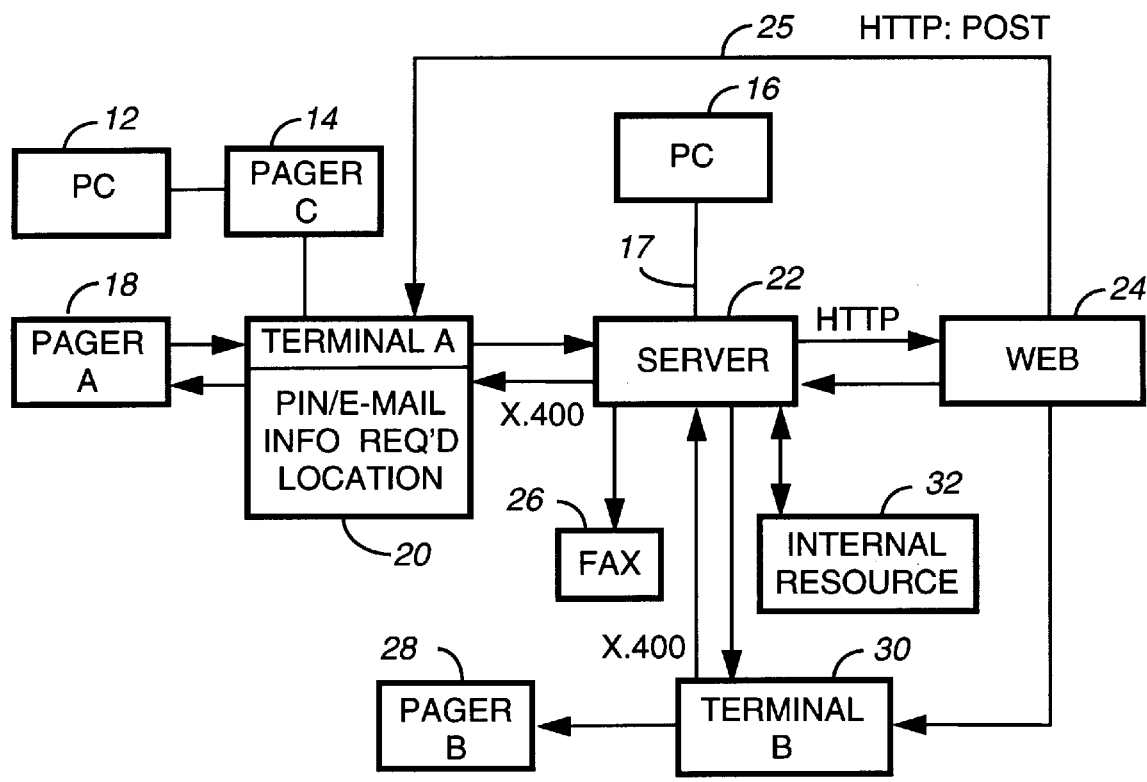
FIG. 1 is a block diagram of a communication system using a selective call transceiver in accordance with the present invention.

Referring to FIG. 1, a communication system 10 for operatively coupling a communication device 18 such as a selective call transceiver to a widely distributed information source 24 is shown. More particularly, the communication system 10 preferably comprises a server 22 coupled to the widely distributed information source 24, wherein the server contains agents for retrieving information customized for a given communication device. The communication device 18 is preferably operatively coupled to the widely distributed information source 24 via a terminal 20 such as Motorola's Wireless Messaging Gateway paging terminal. Operationally, terminal 20 (such as a paging terminal) allows the communication device 18 to request information from the server 22. A transmitter (not shown) preferably coupled to the terminal 20 transmits the information retrieved from the widely distributed information source to the communication device 18. Alternatively, a communication device such as a selective call transceiver 18 can request the information to be forward to any number of devices such as a facsimile machine 26, a computer 16 or another paging terminal 30.

Internet access via a two-way selective call transceiver or pager lends itself to numerous applications. Perhaps the most important would be geographically based and time based retrieval. Certain information requested can be retrieved based on the user location as determined by the communication system 10. More specifically, a two-way paging system having a plurality of base receivers can narrow down the location of the transmitting selective call receiver as is known in the art. Thus, with location information inherent to the communication system, local information such as weather reports, traffic conditions, flight scheduling, etc. can be sent without the user having to specify a location.

A request for information can be originated at the communication device 18 to the server via a paging terminal 20 operatively coupled to the server. Information can be routed back and forth between the server and the paging terminal using an e-mail protocol such as x.400 or back and forth between the server and the paging terminal via the Internet or web using the http post protocol for example. In any event, the information is then retrieved from the widely distributed information source using the agents in the server. The widely distributed information source can be the world wide web, also known as the "web". The information is then transmitted to the communication device such as the selective call transceiver. Ideally, location information for the selective call transceiver is obtained by receiving transmissions from the selective call transceiver at at least one of a plurality of base receivers (not shown) and providing the location information to the agents to further customize the predetermined information being retrieved. Preferably, the information is dynamically parsed in a format configured for a particular selective call transceiver user. Additionally, the selective call transceiver can direct the retrieved information to a second communication device such as a facsimile machine 26, a computer 12 having an electronic mail account (via pager 14), a pager 28, or a cellular phone (not shown). Finally, the method of the present invention may further comprise keeping a state machine of the transceiver user requests, allowing the agent to respond to commands in a context sensitive manner. These "agents" could be programs stored at an internal resource 32 which can include programs for retrieving data from a particular airline reservation system for flight departure and arrival times, gate information, and other information useful in travel including traffic and weather conditions.

A server for retrieving user selected information from a widely distributed information source using a communication device for requesting information wirelessly from the server preferably comprises a memory location for mapping user selectable inputs from the selective call transceiver and inputs from the communication system with tokens, a translator for translating the tokens at the server into retrieval commands for retrieving information from the widely distributed information source, and a formatter for formatting the retrieved information in a format suitable for reception at a device selected by a user of the communication device. The user selectable inputs can be a inputs that assist in screening information based on content, cost to the user, or system constraints. Ideally, inputs from the communication system automatically include all the constraints associated with capacity, location, and possibly user profiles that are retained or observed by the system. For instance, such user profiles can contain the particular limitations of the selective call transceiver used by the user (whether it has sufficient memory, handles voice, text only, graphics only, or any combination of the preceding), or the usage patterns of the user based on location (viewing New York Times when in New York and the Miami Herald when in South Florida or looking at arrival or departure times from a particular airport). In any event, the server would be able to handle much of the processing since the selective call transceiver is preferably a two-way pager using a communication system that is a non-real-time store-and-forward paging system.

Figure 2:
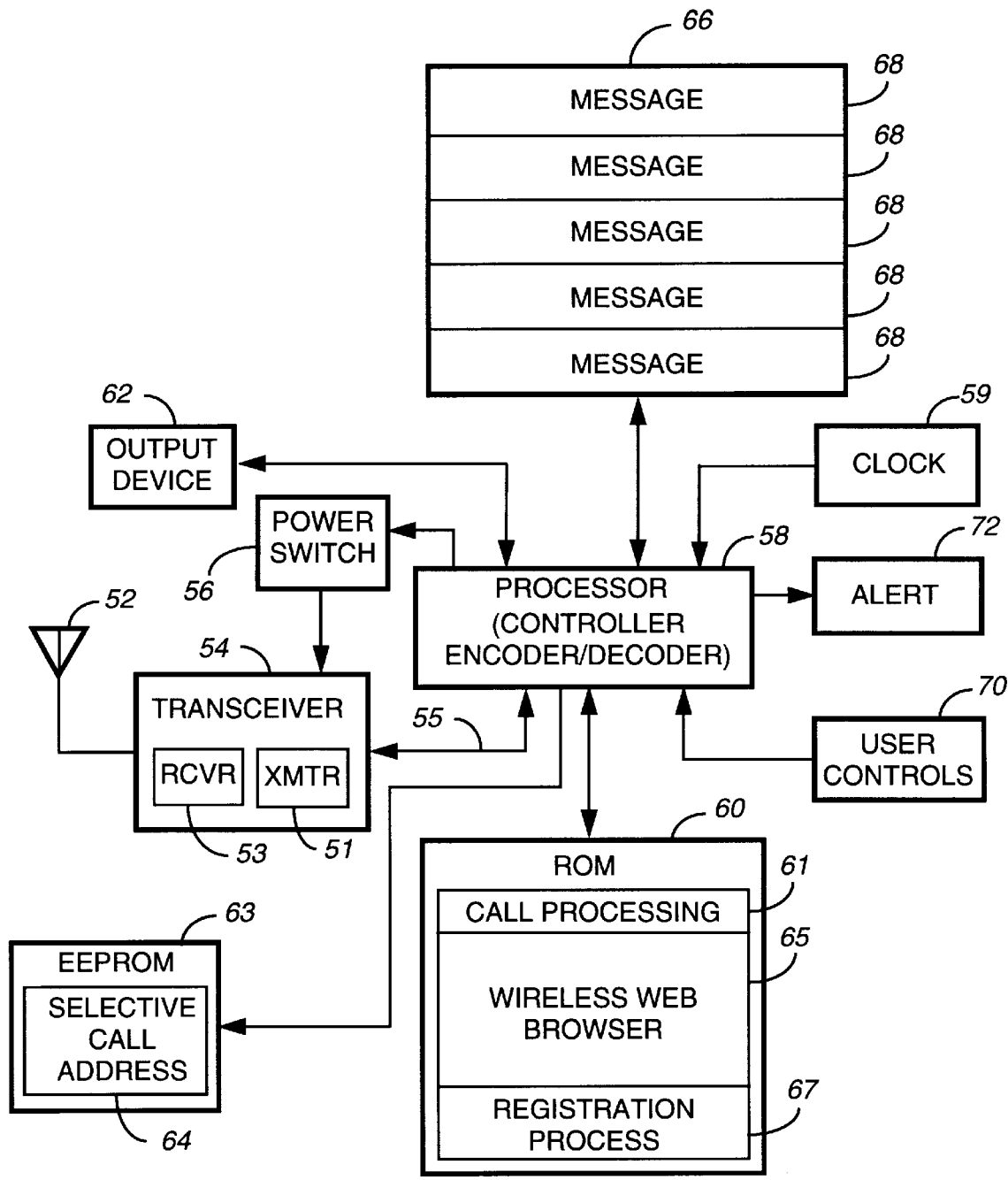
FIG. 2 is a block diagram of a selective call transceiver in accordance with the present invention.

Referring to FIG. 2, an electrical block diagram depicts a communication device 18 such as a selective call transceiver or portable subscriber unit (PSU) in accordance with the present invention. The portable subscriber unit comprises a transceiver antenna 52 for transmitting and intercepting radio signals to and from base stations (not shown). The radio signals linked to the transceiver antenna 52 are coupled to a transceiver 54 comprising a conventional transmitter 51 and receiver 53. The radio signals received from the base stations preferably use conventional two and four-level FSK modulation, but other modulation schemes could be used as well. It will be appreciated by one of ordinary skill in the art that the transceiver antenna 52 is not limited to a single antenna for transmitting and receiving radio signals. Separate antennas for receiving and transmitting radio signals would also be suitable.

Radio signals received by the transceiver 54 produce demodulated information at the output. The demodulated information is transferred over a signal information bus 55 which is preferably coupled to the input of a processor 58, which processes the information in a manner well known in the art. Similarly, response messages including acknowledge response messages are processed by the processor 58 and delivered through the signal information bus 55 to the transceiver 54. The response messages transmitted by the transceiver 54 are preferably modulated using four-level FSK operating at a bit rate of ninety-six-hundred bps. It will be appreciated that, alternatively, other bit rates and other types of modulation can be used as well.

A conventional power switch 56, coupled to the processor 58, is used to control the supply of power to the transceiver 54, thereby providing a battery saving 30 function. A clock 59 is coupled to the processor 58 to provide a timing signal used to time various events as required in accordance with the present invention. The processor 58 also is preferably coupled to a electrically erasable programmable read only memory (EEPROM) 63 which comprises at least one selective call address 64 assigned to the portable subscriber unit 18 and used to implement the selective call feature. The processor 58 also is coupled to a random access memory (RAM) 66 for storing the at least a message in a plurality of message storage locations 68. Of course, other information could be stored that would be useful in a two-way messaging system such as zone identifiers and general purpose counters to preferably count calls (to and from the PSU).

The communication device 18 in the form of a two-way messaging unit may also comprise a transmitter coupled to a encoder and further coupled to the processor 58. It should be understood that the processor 58 in the present invention could serve as both the decoder and encoder.

When an address is received by the processor 58, the call processing element 61 preferably within a ROM 60 compares the received address with at least one selective call addresses 64, and when a match is detected, a call alerting signal is preferably generated to alert a user that a message has been received. The call alerting signal is directed to a conventional audible or tactile alert device 72 coupled to the processor 58 for generating an audible or tactile call alerting signal. In addition, the call processing element 61 processes the message which preferably is received in a digitized conventional manner, and then stores the message in the message storage location 68 in the RAM 66. The message can be accessed by the user through conventional user controls 70 coupled to the processor 58, for providing functions such as reading, locking, and deleting a message. Alternatively, messages could be read through a serial port (not shown). For retrieving or reading a message, an output device 62, e.g., a conventional liquid crystal display (LCD), preferably also is coupled to the processor 58. It will be appreciated that other types of memory, e.g., EEPROM, can be utilized as well for the ROM 60 or RAM 66 and that other types of output devices, e.g., a speaker, can be utilized in place of or in addition to the LCD, particularly in the case of receipt of digitized voice. The ROM 60 also preferably includes elements for handling the registration process (67) and for web browsing (65) among other elements or programs.

Again referring to FIG. 2, a communication device 18 that reminds a user to change the operational mode of the communication device preferably comprises a transceiver 54 a decoder and an encoder (58) coupled to the transceiver for respectively decoding messages received and encoding messages transmitted by the communication device, and a processor (58). The processor is preferably programmed to maintain a clock within the communication device, store a schedule for an upcoming event in a memory coupled to the communication device, and prompt a user of the communication device at a predetermined time before the upcoming event to update the status of the event. If requested by the user, the memory is updated with the status of the upcoming event by wirelessly retrieving data from a widely distributed information source such as the web. Then, the mode of operation of the communication device can be changed based on the status of the upcoming event as updated. The processor can change the mode of operation manually by the user using user controls 70 or automatically. If manually done, the processor preferably prompts the user to change the mode of operation of the communication device based on the status of the upcoming event as updated.

In a more specific example, the communication device 18 such as a selective call transceiver can wirelessly retrieve flight information from a widely distributed information source. Preferably the communication device has a memory coupled to the decoder for storing at least flight information and updated status information of the flight information, and a processor programmed to remind a user of the communication device at a predetermined time before a scheduled flight to update the status of the scheduled flight. Again, if requested by the user, the communication device would update the status of the scheduled flight by wirelessly retrieving data from the widely distributed information source. As mention before, the processor is also programmed to prompt the user of the communication device to change the mode of operation of the communication device based on the updated status information. Optionally, the processor can be further programmed to delay a predetermined amount of time before reminding a user again to update the status of the scheduled flight in response to a user not requesting the updated status information. The communication device 18 can further include a timer (59) that allows the processor to be further programmed to automatically power down at least a portion of the communication device or to prompt the user of the communication device to power down at least a portion of the communication device a predetermined time before a departure time of the scheduled flight using the updated data. Preferably, the processor is further programmed to store the time when at least a portion of the communication device is powered down so as to allow for the calculation of the flight duration from the updated data by subtracting a departure time from an arrival time. Then, the user can be prompted to turn at least a portion of the communication device on at a predetermined time after powering down a portion of the communication device. In a broader sense, the processor can be further programmed to remind the user of the communication device to update the status of the scheduled flight within (either before or after) a predetermined time of a scheduled arrival of the scheduled flight. Likewise, the processor can also be programmed to remind the user of the communication device to change the mode of operation of the communication device within (either before or after) a predetermined time of a scheduled arrival of the scheduled flight.

Figure 3:
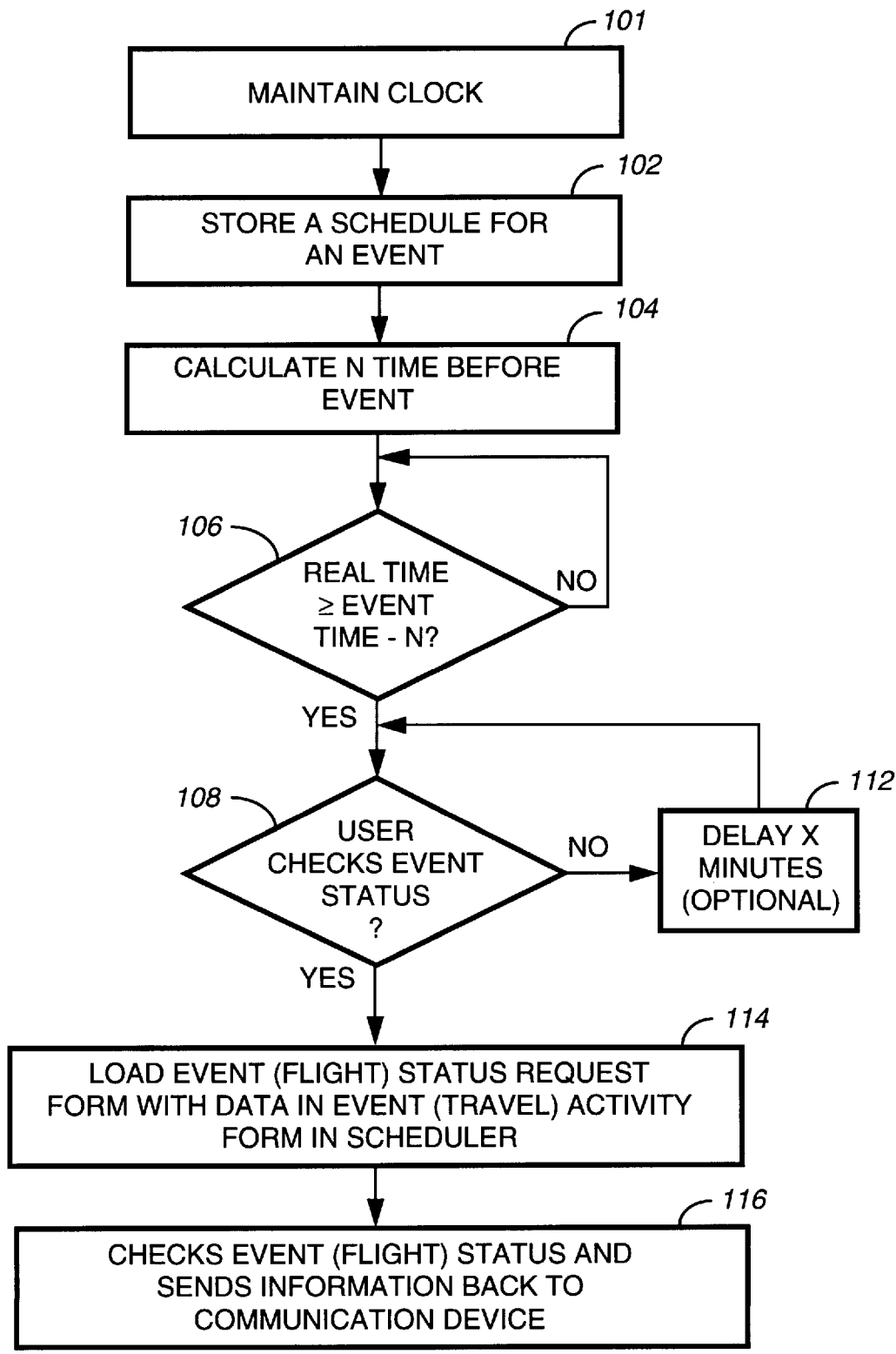
FIG. 3 is a flow diagram illustrating a method of reminding a user of an upcoming event in accordance with the present invention.
Figure 4:
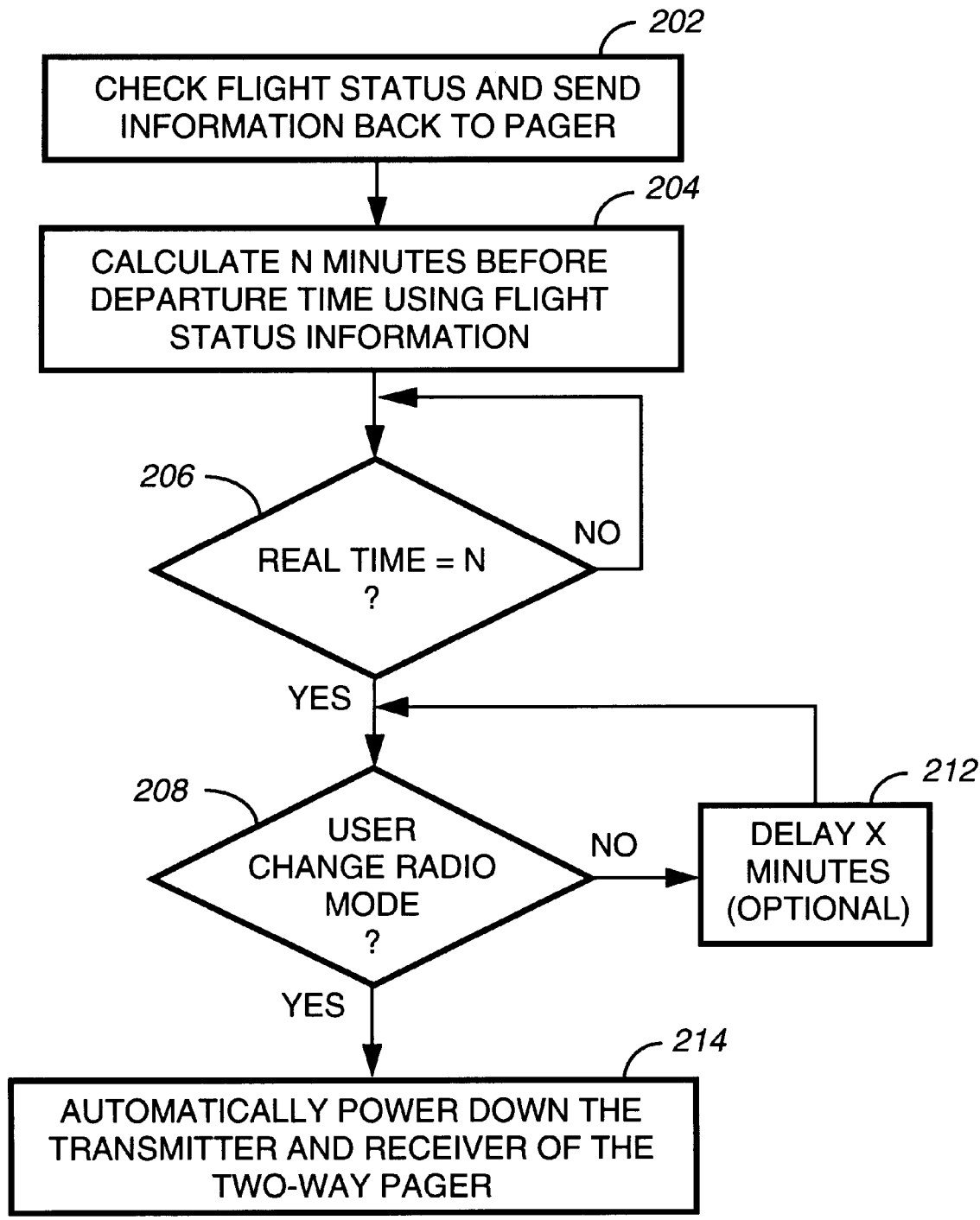
FIG. 4 is a flow diagram illustrating a method of reminding and prompting a user of a communication device of a upcoming event requiring a change of mode in operation in accordance with the present invention.
Figure 5:
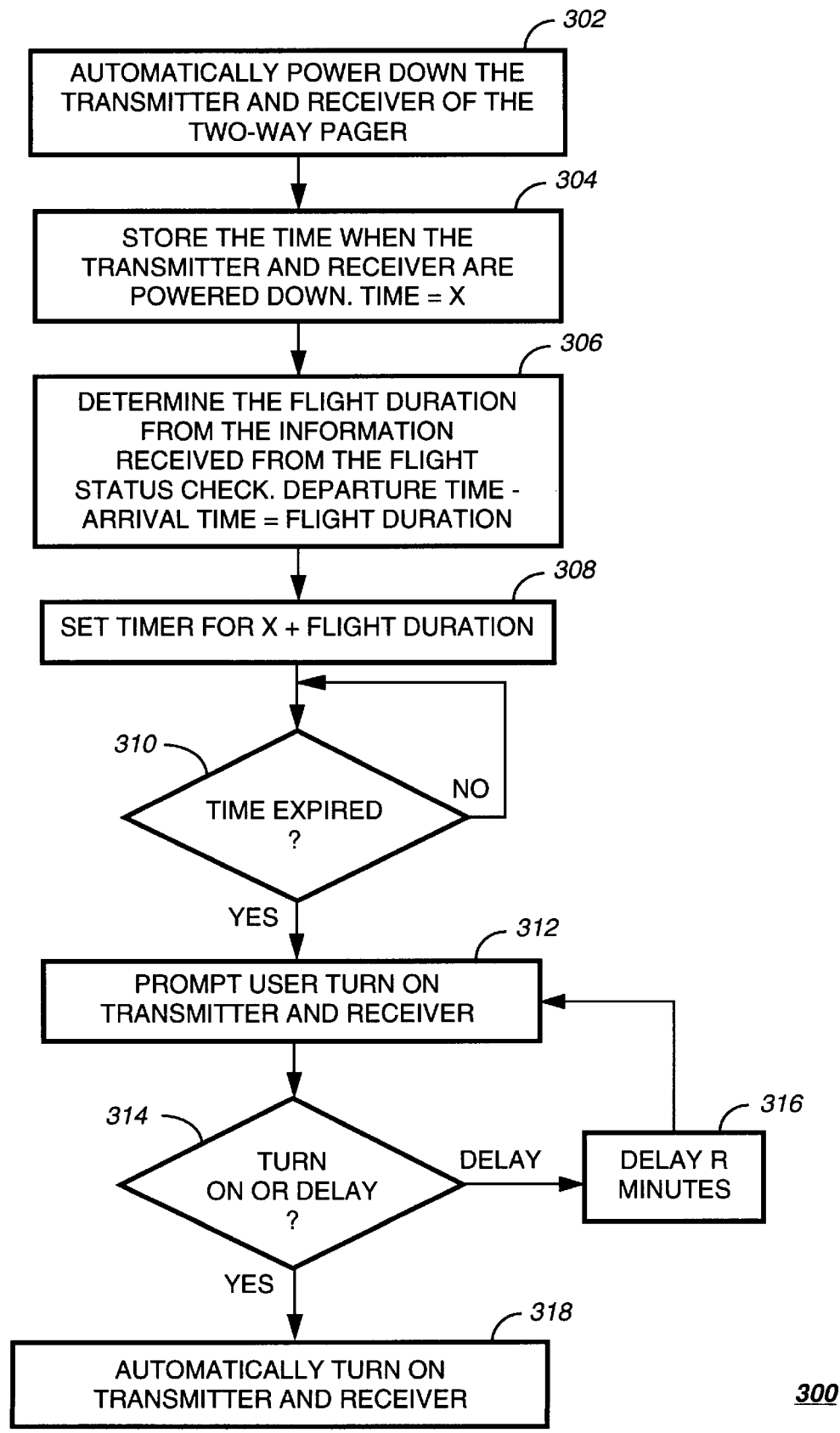
FIG. 5 is another flow diagram illustrating a method of reminding and prompting a user of a communication device of a upcoming event requiring a change of mode in operation in accordance with the present invention.

Referring to FIGS. 3–5, a method for prompting a user to change the mode of operation of an electronic device based on an event preferably comprises the step 101 of maintaining a clock within the electronic device and the step 102 of storing a schedule for the event in a memory coupled to the electronic device. This could be as simple as entering data from a travel itinerary into a travel activity form in a scheduler within the electronic device. At step 104, a predetermined amount of time n before the scheduled event is calculated and at decision block 106 a determination is made whether a period n before departure time has expired wherein the user is subsequently prompted at to update the status of the event if the time expired. If the user decides to check the status of the event at decision block 108, then the electronic device is updated with the status of the event by wirelessly retrieving data from a widely distributed information source at steps 114 and 116. The steps 114 and 116 of updating could comprise the step of retrieving information from an airline carrier providing flight information on the Internet. If the user at decision block 108 does not want to update the status of an event such as a flight departure or arrival time, then a delay step 112 can optionally be implemented so that the user can be prompted at a future period in time.

Now referring to FIG. 4, once the status information is retrieved at step 202 (same information retrieved at step 116 of FIG. 3), a predetermined amount of time n is calculated before the scheduled event at step 204 wherein at decision block 206 a determination is made whether a period n before departure time has expired. If the period has expired at decision block 206, the user is prompted at decision block 208 to change the mode of operation of the communication device such as turning off at least a portion of the transceiver in response to realizing that the departure time is soon approaching. If the user wishes to change the mode of operation of the communication device at decision block 208, then the device mode of operation is changed at step 214 in accordance with the user's intentions. The mode operation change could include automatically powering down the transmitter and receiver of a selective call two-way pager or powering up and requesting another update in or an individual having such a portable electronic device is due to pick an airline passenger up at a period after the arrival time, the communication device could power up and prompt the user (preferably at some period of time before arrival time) to request an update to the status of the event (the flight arrival time). If the arrival time has been delayed, this would save the cab driver or individual wasted time spent at the airport and may further add battery life to the communication device by allowing the device to remain in a battery saving mode until the update to the arrival time is requested.

The present invention could easily be implemented using a PageWriter™2000 two-way messaging subscriber unit made by Motorola, Inc., but can be equally used by any two-way communication device that can access a widely distributed information source such as the web. The current PageWriter™2000 unit has an application called WebQuest whereby a user can request certain information to be retrieved from the Internet. One type of information currently available is Flight Status. This allows a user to check on a particular flight by entering the airline, flight number, departure date and destination. WebQuest will check on the current flight status of the requested flight and transmit this information back to the PageWriter™2000 unit. Currently this feature requires the user to a) remember to check a flight status and b) manually enter the required information to make the request.

Another problem related to airline travel is remembering to comply with the airline safety rules by changing the radio mode in the PageWriter™2000 unit so that the transmitter and receiver are turned off during a flight. Currently PageWriter™2000 unit users must remember to change the radio mode on their own. The flight attendants verbally remind passengers to turn off their electronic devices prior to take off but this may not serve as enough of a reminder. On the other hand, the user must also remember to change the radio mode back to full two-way service once the plane has landed or no new messages will be received.

The Scheduler currently used in PageWriter™2000 unit is modified so that the user is allowed to select a special Travel Activity form instead of the generic Activity form currently available. The Travel Activity form consists of three fields: 1) airline (choose from a menu) 2) flight number 3) destination code. All of this information can be easily obtained from the users ticket. The user can also set an alarm if desired as can be done with the current Scheduler. Since a user normally enters their schedule of events into the Scheduler application, no additional data input burden is placed on the user to use this invention.

In accordance with the present invention, at a preset time (or a user selectable time) before the scheduled time of departure, the user is automatically prompted by the PageWriter™2000 unit and asked whether the user desires to check the flight status using WebQuest. A simple "yes/no" question is asked. If "yes" is selected by the user, WebQuest will automatically be loaded with the flight information previously stored in the Travel Activity form in the Scheduler as discussed above (date, airline, flight number, destination). No additional information is required to be entered by the user. WebQuest will send back the appropriate flight status information without any additional input by the user. This serves as an automatic reminder to check on the status of an upcoming scheduled flight which would have normally been left for the user to remember and then manually enter the required flight information in WebQuest. FIG. 3 is a flow chart of the above described invention.

In a second aspect of the invention described above, the same information entered into the Travel Activity form discussed above is used. Thus, at a preset time (or a user selectable time) before the actual departure time entered in the Scheduler (or optionally obtained from the WebQuest flight status request), the user is prompted to change the radio mode of the PageWriter™2000 unit to an inflight condition (i.e. transmitter and receiver turned off). A simple "yes/no" question is asked. If "yes" is selected, the PageWriter™2000 unit is automatically placed in the proper radio mode for an inflight condition. No additional selections are required. Currently several steps (or button pushes) are required to change the radio mode of a PageWriter™2000 unit to an inflight condition. This invention solves the problem of burdening the user to remember to change the radio mode and requiring so many button pushes to perform the change. Optionally, the user could be asked to delay answering the "yes/no" question by 10 minutes, for example, to account for flights that are delayed at the last minute. The prompt simply repeats until the user answers yes or no. FIG. 4 is a flow chart of the above described invention.

Finally, the PageWriter™2000 unit could use the flight status information from the WebQuest (departure time and arrival time) and the time at which the user changed the radio mode for an inflight condition to calculate the anticipated time of arrival. With this information, the PageWriter™2000 unit would prompt the user if a change in the radio mode back to full two-way service is needed. If the flight is late, a delayed answer can be used, as described above, so that the radio mode is not changed while the user is still in flight. This embodiment relieves the burden of having to remember to change the radio back to full service upon arrival. Without doing so, a user will not receive any new messages until after the time when the user finally realizes to change the radio mode. FIG. 5 is a flow chart of the above described invention.

The above description is intended by way of example only and is not intended to limit the present invention in any way except as set forth in the following claims.

What is claimed is:

1. A method for prompting a user to change a mode of operation of an electronic device based on an updated event time, the method comprising the steps of:
   maintaining a clock within the electronic device;
   storing an event time in a memory coupled to the electronic device;
   prompting a user of the electronic device within a predetermined time of the event time to request a wireless update of the event time; and
   updating the electronic device with the event time if requested by the user by wirelessly retrieving data from an independent widely distributed information source.

2. The method of claim 1, wherein the step of storing a schedule for the event comprises the step of storing a travel itinerary in the electronic device.

3. The method of claim 1, wherein the step of updating further comprises the step of retrieving information from an airline carrier providing flight information on an Internet site.

4. The method of claim 1, wherein the method further comprises the step of turning off at least a portion of the electronic device in response to the user confirming attendance at the event.

5. The method of claim 1, wherein the method further comprises the step of prompting the user to request an update to the status of the event at a termination time of the event.

6. The method of claim 1, wherein the method further comprises the step of prompting the user to change the mode of operation of the electronic device at a termination time of the event.

7. The method of claim 1, wherein the step of prompting further comprises the step of prompting a user at a predetermined time before the event as scheduled to update the status of the event.

8. A communication device that reminds a user to change an operational mode of the communication device, comprising:
   a transceiver;
   a decoder and an encoder coupled to the transceiver for respectively decoding messages received and encoding message transmitted by the communication device; and
   a processor programmed to:
      maintain a clock within the communication device;
      store a schedule for an upcoming event in a memory coupled to the communication device;
      prompt a user of the communication device at a predetermined time before the upcoming event to update a status of the event;
      update the memory coupled to the communication device with the status of the upcoming event if requested by the user by wirelessly retrieving data from a widely distributed information source;
      change a mode of operation of the communication device based on the status of the upcoming event as updated.

9. The communication device of claim 8, wherein the processor automatically changes the mode of operation of the communication device based on the status of the upcoming event as updated.

10. The communication device of claim 8, wherein the processor prompts the user to change the mode of operation of the communication device based on the status of the upcoming event as updated.

11. A communication device wirelessly coupled to a widely distributed information source and capable of retrieving flight information therefrom, comprising:
   a receiver
   a decoder coupled to the receiver for decoding messages received at the
   communication device;
   a transmitter coupled to the decoder;
   a memory coupled to the decoder for storing at least flight information, and updated status information of the flight information; and
   a processor programmed to:
      remind a user of the communication device at a predetermined time before a scheduled flight to update the status of the scheduled flight;
      update the communication device with the status of the scheduled flight if requested by the user by wirelessly retrieving data from the widely distributed information source; and
      prompt the user of the communication device to change the mode of operation of the communication device based on the updated status information.

12. The communication device of claim 11, wherein the communication device comprises a selective call transceiver.

13. The communication device of claim 11, wherein the processor is further programmed to delay a predetermined amount of time before reminding a user again to update the status of the scheduled flight in response to a user not requesting the updated status information.

14. A communication device wirelessly coupled to a widely distributed information source and capable of retrieving flight information therefrom, comprising:

a transceiver;

a decoder and an encoder coupled to the transceiver for respectively decoding messages received and encoding massage transmitted by the communication device; and a memory coupled to the decoder for storing at least scheduled flight information, and updated status information of the scheduled flight information; and a processor programmed to remind a user of the communication device at a predetermined time before a scheduled flight to update a status of the scheduled flight information.

15. The communication device of claim 14, wherein the processor is further programmed to update the communication device with the status of the scheduled flight when requested by the user by wirelessly retrieving updated data from the widely distributed information source.

16. The communication device of claim 15, wherein the communication device further comprises a timer that allows the processor to be further programmed to prompt the user of the communication device to power down at least a portion of the communication device a predetermined time before a departure time of the scheduled flight using the updated data.

17. The communication device of claim 15, wherein the communication device further comprises a timer that allows the processor to be further programmed to turn off at least a portion of the communication device a predetermined time before a departure time of the scheduled flight using the updated data.

18. The communication device of claim 16, wherein the processor is further programmed to store a time when at least a portion of the communication device is powered down, calculate a flight duration from the updated data by subtracting a departure time from an arrival time, and to prompt the user to turn at least a portion of the communication device on a predetermined time after powering down the at least a portion of the communication device.

19. The communication device of claim 14, wherein the processor is further programmed to remind the user of the communication device to update the status of the scheduled flight within a predetermined time of a scheduled arrival of the scheduled flight.

20. The communication device of claim 16, wherein the processor is further programmed to remind the user of the communication device to change the mode of operation of the communication device within a predetermined time of a scheduled arrival of the scheduled flight.

* * * * *